(12) United States Patent
Coudron

(10) Patent No.: US 10,792,984 B2
(45) Date of Patent: Oct. 6, 2020

(54) TAILGATE PROVIDED WITH A TRIM THAT MAKES IT POSSIBLE TO REDUCE THE SILKSCREEN PRINTING OF THE WINDOW

(71) Applicant: Compagnie Plastic Omnium, Lyons (FR)

(72) Inventor: Philippe Coudron, Caluire et Cuire (FR)

(73) Assignee: Compagnie Plastic Omnium, Lyons (FR)

(*) Notice: Subject to any disclaimer, the term of this patent is extended or adjusted under 35 U.S.C. 154(b) by 148 days.

(21) Appl. No.: 15/764,903

(22) PCT Filed: Sep. 29, 2016

(86) PCT No.: PCT/FR2016/052490
§ 371 (c)(1),
(2) Date: Mar. 30, 2018

(87) PCT Pub. No.: WO2017/055756
PCT Pub. Date: Apr. 6, 2017

(65) Prior Publication Data
US 2018/0272846 A1 Sep. 27, 2018

(30) Foreign Application Priority Data
Sep. 30, 2015 (FR) ...................... 15 59258

(51) Int. Cl.
*B60J 5/10* (2006.01)
*B60R 13/02* (2006.01)
(Continued)

(52) U.S. Cl.
CPC ............... *B60J 5/107* (2013.01); *B60J 1/006* (2013.01); *B60J 1/18* (2013.01); *B60J 10/84* (2016.02); *B60R 13/0243* (2013.01)

(58) Field of Classification Search
CPC ... B60J 5/107; B60J 10/84; B60J 1/006; B60J 1/18; B60R 13/0243
(Continued)

(56) References Cited

U.S. PATENT DOCUMENTS 6,616,215 B2 * 9/2003 Pommeret ................ B60Q 1/30
296/146.15
7,828,365 B2 * 11/2010 Kiriakou .................. B60J 5/107
296/146.1

FOREIGN PATENT DOCUMENTS

DE 102011000063 A1 7/2012
FR 2768085 A1 3/1999
(Continued)

*Primary Examiner* — Joseph D. Pape
*Assistant Examiner* — Dana D Ivey
(74) *Attorney, Agent, or Firm* — St. Onge Steward Johnston & Reens, LLC

(57) ABSTRACT

The invention relates to a tailgate of a motor vehicle having at least one side post to which a window is added, the post constituting a U-shaped profile member with an open cross-section, in which the opening is turned towards the window, the profile member including a base provided with a first side flank and a second side flank. The second flank includes a trim which curves, opposite the Y0 of the vehicle, towards the first flank so as to at least partially close the opening of the profile member, the trim being added to the second flank without reducing the rear field of vision.

16 Claims, 5 Drawing Sheets

(51) Int. Cl.
*B60J 1/18* (2006.01)
*B60J 1/00* (2006.01)
*B60J 10/84* (2016.01)

(58) Field of Classification Search
USPC .................................................... 296/146.2
See application file for complete search history.

(56) References Cited

FOREIGN PATENT DOCUMENTS

| FR | 2927876 A1 * | 8/2009 | ............... B60J 1/18 |
|---|---|---|---|
| FR | 2927876 A1 | 8/2009 | |
| JP | 2014131896 A | 7/2014 | |
| WO | 2009056775 A2 | 5/2009 | |

* cited by examiner

TAILGATE PROVIDED WITH A TRIM THAT MAKES IT POSSIBLE TO REDUCE THE SILKSCREEN PRINTING OF THE WINDOW

FIELD OF THE INVENTION

This invention relates to the technical field of motor vehicle tailgates.

BACKGROUND OF THE INVENTION

A tailgate box comprising upper and lower parts each intended to be covered by a bodywork skin is already known in the state of the art.

The upper and lower parts are connected together by two side posts between which an opening intended to accommodate a transparent window is generally provided.

The window is therefore added, mainly by bonding, to the side posts, which can be made of sheet metal.

A post made of plastic is also known, for example from application WO2009056775. This type of post constitutes a U-shaped profile member with an open cross-section. This opening can be closed by an element thereby ensuring the continuity of the bonding track.

A post made of plastic, constituting a U-shaped profile member with an open cross-section, but comprising a plate substantially parallel to the window at the end of the U located towards the outside of the vehicle, is also known.

For each of these posts, the bonding area and the post would be visible from outside the vehicle through the transparent window, which would not be acceptable for motor vehicle manufacturers, forcing them to use parts to hide this area: style part, exterior trim, spoiler, etc.

To hide the bonding area, it is also known to equip the windows with silkscreen printing at the area of contact with the post. Silkscreen printing is a deposit of generally black ink on the window, to make the window glass opaque. The problem with this technique is that a very wide silkscreened area is necessary (at least as wide as the bonding track or even wider than the post) to hide the bonding area properly.

This type of enlarged area is not only unsightly but, in particular, it limits the driver's rear view even more than the post.

Moreover, while the silkscreen printing is sufficient to hide the bonding area, it is not always sufficient to hide the vertical wall of the side post when looking sideways through the window.

To overcome this problem, it is known to use trims for posts. A trim is added to the side post, and is positioned and dimensioned so as to hide the side wall from inside the vehicle. Thus, from outside the vehicle, the trim, whose appearance may be acceptable for motor vehicle manufacturers, is seen instead of the post.

However, it is often necessary to have wide silkscreen printing to hide the side edge of the post turned towards the Y0 of the vehicle and/or its trim.

A solution using a trim comprising a partial return towards the side edge of the post opposite to the Y0 of the vehicle is also known. However, such a solution also limits the drivers rear view, as shown on FIG. 1.

SUMMARY OF THE INVENTION

The invention aims to remedy these disadvantages by providing a tailgate fitted with posts provided with trim to hide the post up to the track for bonding the window without reducing the rear view.

Thus, the invention relates to a plastic tailgate comprising at least one side post to which a window is added, the post constituting a U-shaped profile member with an open cross-section, in which the opening is turned towards the window, said profile member including a base provided with a first side flank and a second side flank. The second flank includes a trim which curves, opposite the Y0 of the vehicle, towards the first flank so as to at least partially close the opening of the profile member, the trim being added to the second flank without reducing the rear field of vision.

Thanks to the invention, the silkscreen printing of the window can be reduced, so as to mask only (at least) the bonding area between the window and the post. This balances the black vertical and horizontal borders around the window. The upper and lower silkscreen printings (along the vehicle Z-axis) are generally narrower than the side silkscreen printings, as shown on FIG. 2. The invention therefore harmonises the width of the silkscreen printing all around the window.

In addition, the trim hides the side post while preserving the driver's rear field of vision, since the intrusion of the trim into the passenger compartment is limited.

The device may further comprise one or more of the following characteristics, taken alone or in combination:
 the trim curves so as to close at least 50% of the opening of the profile member;
 the trim curves up to an area intended to form a sealing track with an inner vehicle body;
 the trim curves up to a bonding track between the window and the first flank;
 the trim is added to the surface of the second flank outside the opening;
 the trim is added to the surface of the second flank inside the opening;
 the trim is added in the continuity of the surface forming the second flank;
 the first flank is provided with a surface having a track for bonding with the window;
 the second flank is shorter than the first flank;
 the window comprises silkscreen printing designed to hide a bonding area between the window and the post;
 the post and/or the trim are made of plastic.

BRIEF DESCRIPTION OF THE DRAWINGS

The invention will be better understood on reading the accompanying figures, which are given solely by way of example and not limiting in any way, in which.

DETAILED DESCRIPTION OF THE INVENTION

Figure 1A:
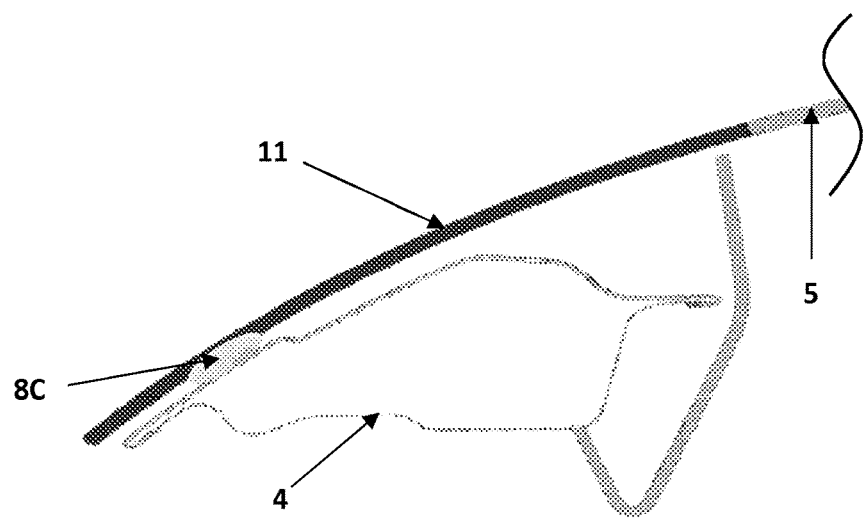
FIG. 1A illustrates a section of a steel side post of a tailgate according to the prior art.
Figure 1B:
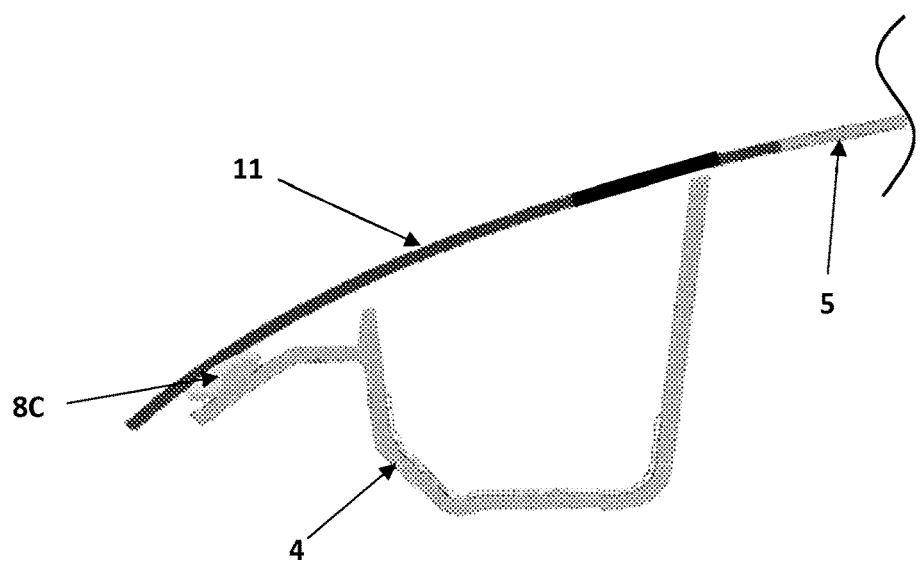
FIG. 1B illustrates a section of a plastic side post of a tailgate according to the prior art.
Figure 2:
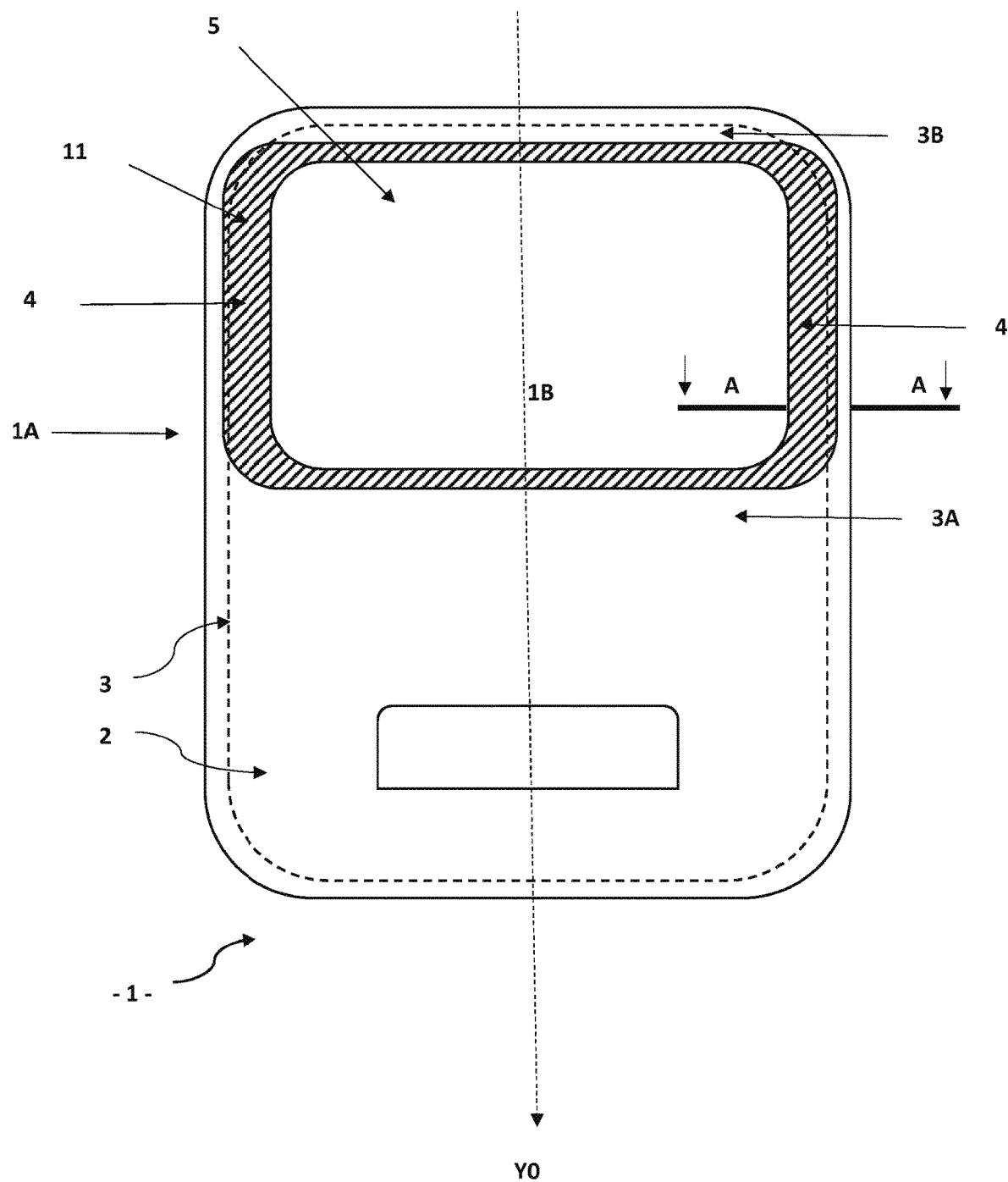
FIG. 2 illustrates a rear view of an embodiment of a tailgate according to the invention.

We now refer to FIG. 2, which illustrates an embodiment of the tailgate 1 according to the invention.

This plastic tailgate 1 comprises an outer skin 2 and an inner box 3. The box 3 comprises a lower part 3A and an upper part 3B connected together by two side posts 4. A window 5 is added to the posts.

Figure 3:
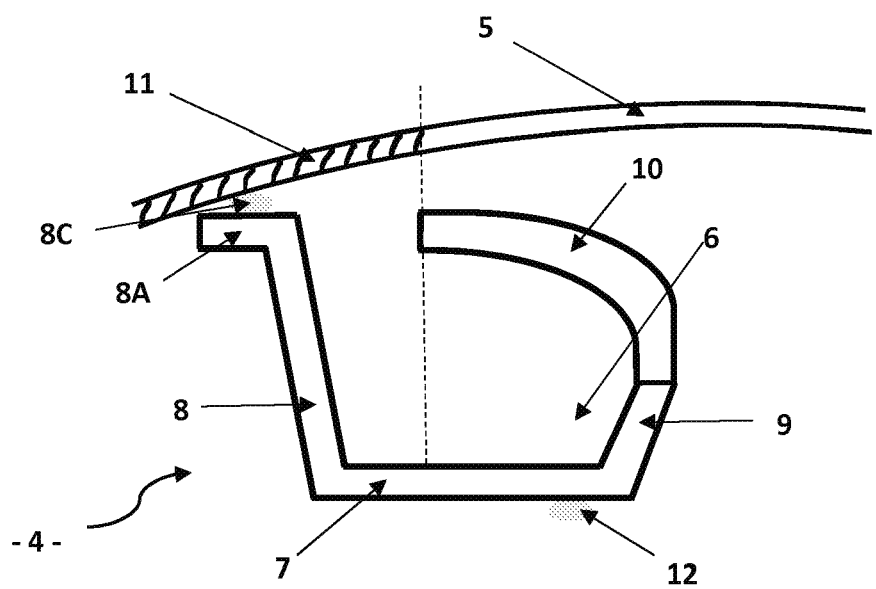
FIG. 3 is a diagram through a transverse cross-section A-A of a tailgate side post according to the invention.
Figure 4A:
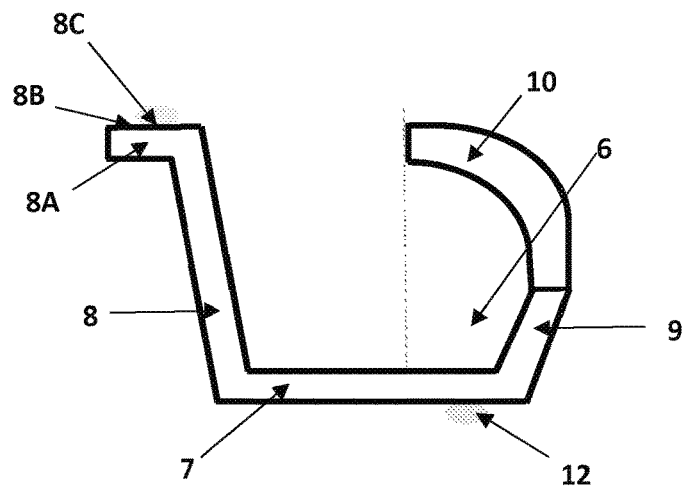
FIGS. 4A to 4C are diagrams through a transverse cross-section A-A of a tailgate side post according to the invention, illustrating three embodiments in which the trim curves toward the outer flank to a greater or lesser extent.
Figure 4B:
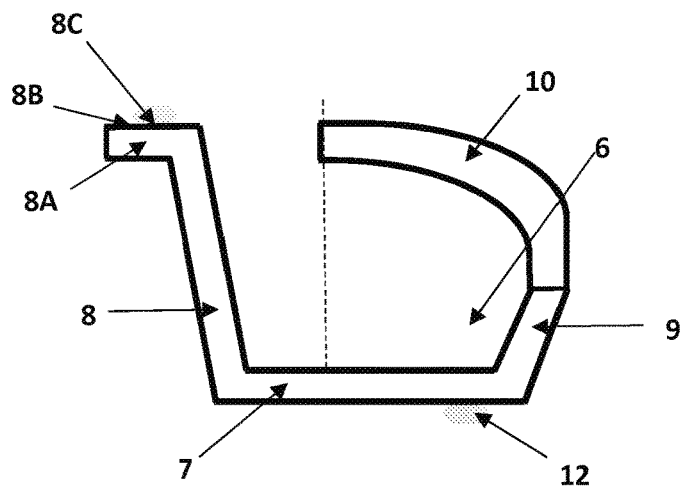
Figure 4C:
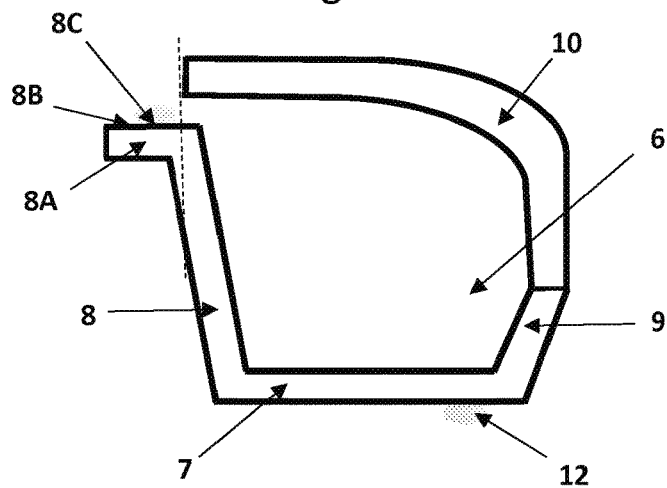

We now refer to FIG. 3, which illustrates an embodiment of a post 4 according to the invention. FIG. 3 shows a transverse cross-section of a post 4.

The post 4 constitutes a U-shaped profile member with an open cross-section, in which the opening 6 is turned towards the window 5. Advantageously, the post 4 is made of plastic.

The profile member thus comprises a base 7 forming the bottom of the U, and located towards the front of the vehicle when the tailgate 1 is in the closed position on the vehicle: the opening of the U of the post 4 is thus directed towards the rear of the vehicle in this position.

The base 7 is provided with two side flanks 8 and 9.

The first flank 8 is located on the side edge 1A of the tailgate 1, opposite to the Y0. This first flank 8 starts from the base 7 towards the window 5. This flank 8 constitutes the wall of the post 4 opposite the Y0 of the vehicle when the tailgate 1 is mounted on the vehicle. This flank 8 is provided with an edge 8A comprising a track 8B for bonding with the window 5.

Advantageously, the window comprises a silkscreen printing 11 designed to hide the bonding track 8B and the glue 8C from outside the vehicle.

The second flank 9 is oriented towards the middle 1B of the tailgate 1, i.e. towards the Y0 of the vehicle. This second flank 9 starts from the base 7 towards the window 5. This second flank 9 constitutes the wall of the post 4 turned towards the Y0 axis of the vehicle when the tailgate 1 is mounted on the vehicle.

Preferably, this second flank 9 is shorter than the first flank 8, thereby forming, with the base 7, an "incomplete U" cross-section, as shown on FIGS. 3 to 5C.

A trim 10 is added to this second flank 9, extending the flank 9 and curving, opposite the Y0 of the vehicle, toward the first flank 8 so as to at least partially close the opening 6 of the profile member. Advantageously, the trim 10 is made of plastic.

The trim 10 is added to the second flank 9 while limiting its internal offset. The internal offset of the trim corresponds to a shift directed towards the Y0 of the vehicle. Thus, the trim 10 is added to the second flank 9 so as not to extend more than the second flank 9 itself towards the Y0 of the vehicle.

Such internal offset affects the rear field of vision (rear view). The rear field of vision is the driver's field of vision when looking behind the vehicle through the rear window 5. This field can be characterised by the rear angle of vision, which is the angle D (FIGS. 5A-5C) defined between the Y0 of the vehicle and a straight line intersecting the Y0 towards the front of the vehicle and tangential to one of the side edges of a post oriented towards the Y0.

Thus, the trim 10 is added to the second flank 9 without substantially reducing the rear field of vision.

Advantageously (FIG. 4A), the trim 10 curves toward the first flank 8 so as to close at least 50% of the opening 6 of the profile member. The trim 10 therefore hides the post 4, and reduces the area occupied by the silkscreen printing 11.

According to one embodiment (FIG. 4B), the trim 10 curves up to an area 12 intended to form a sealing track with an inner vehicle body.

According to another embodiment (FIG. 4C), the trim 10 curves up to the bonding track 8B between the window 5 and the first flank 8.

The trim 10 can be added in different ways to the second flank 9. The main thing is that the trim 10, once added, does not substantially reduce the rear field of vision. The rear angle of vision (without trim) is denoted D on FIGS. 5A to 5C.

Figure 5A:
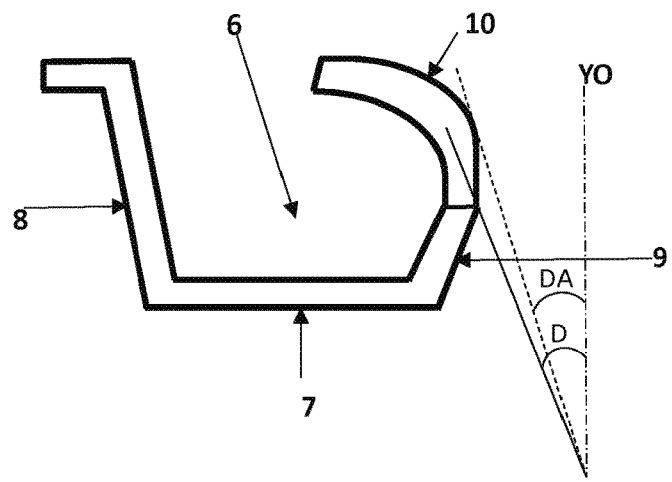
FIGS. 5A to 5C are diagrams through a transverse cross-section A-A of a tailgate side post according to the invention, illustrating three embodiments in which the trim is inserted on the inner flank of the post.

Thus, as shown on FIG. 5A, the trim 10 can be added to the second flank 9 on its surface located outside the opening. In this case, the rear angle of vision (denoted DA) is very slightly reduced, to such a point that it has virtually no impact on the driver's field of vision.

Figure 5B:
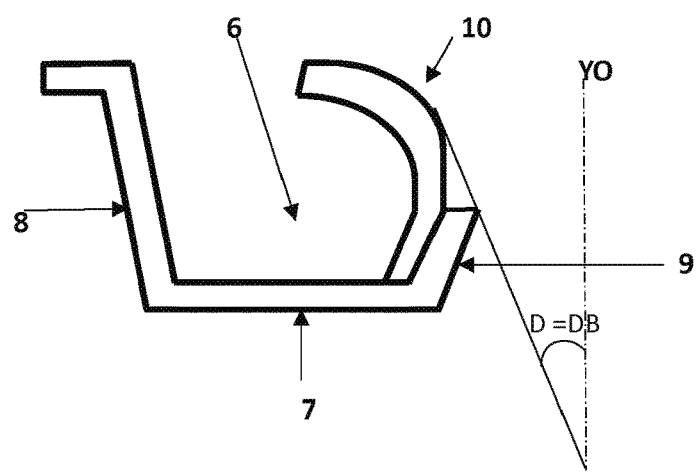

As shown on FIG. 5B, the trim 10 can be added to the second flank 9 on its surface located inside the opening. In this case, the rear angle of vision (denoted DB) is not affected.

Figure 5C:
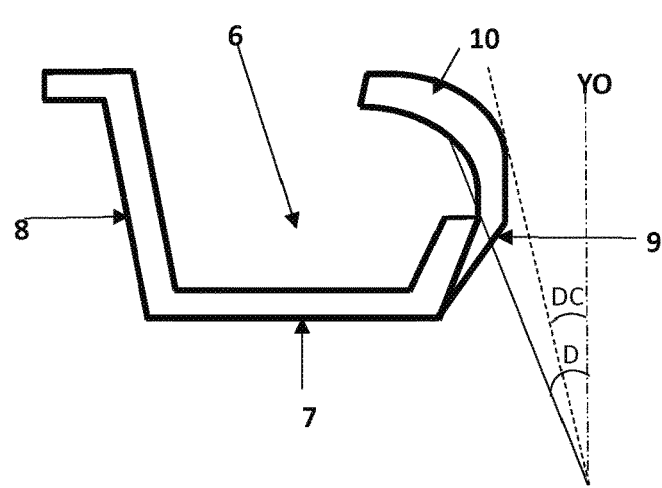

Lastly, as shown on FIG. 5C, the trim 10 can be added to the second flank 9 in the continuity of the surface forming the second flank 9. In this case, the rear angle of vision (denoted DC) is reduced, to such a point that it has an impact on the driver's field of vision. However, this impact is less than with a conventional trim.

The invention claimed is:

1. A tailgate of a motor vehicle comprising at least one side post to which a window is added, the side post constituting a U-shaped profile member with an open cross-section, in which an opening of the U-shaped profile member is turned towards the window, said U-shaped profile member including a base provided with a first side flank and a second side flank, wherein the first side flank is provided with a surface having a track for bonding with the window the second side flank including a trim which curves, opposite a median longitudinal plane of the vehicle, towards the first flank so as to at least partially close the opening of the U-shaped profile member, the trim being added to the second side flank and extending from the second side flank without reducing a rear field of vision.

2. The tailgate according to claim 1, wherein the trim curves so as to close at least 50% of the opening of the U-shaped profile member.

3. The tailgate according to claim 2, wherein the trim curves up to an area intended to form a sealing track with an inner vehicle body.

4. The tailgate according to claim 2, wherein the trim curves up to the track between the window and the first side flank.

5. The tailgate according to claim 1, wherein the trim is added to a surface of the second side flank outside the opening.

6. The tailgate according claim 1, wherein the trim is added to a surface of the second side flank inside the opening.

7. The tailgate according to claim 1, wherein the trim is added in a continuity of a surface forming the second side flank.

8. The tailgate according to claim 1, wherein the second side flank is shorter than the first side flank.

9. The tailgate according to claim 1, wherein the window comprises silkscreen printing designed to hide a bonding area between the window and the post.

10. The tailgate according to claim 1, wherein the post and the trim are made of plastic.

11. The tailgate according to claim 1, wherein the post is made of plastic.

12. The tailgate according to claim 1, wherein the trim is made of plastic.

13. The tailgate according to claim 1 wherein the trim is connected at a first end to the second side flank and the trim extends towards a second end thereof such that the second end is spaced away from the window.

14. The tailgate according to claim 1 wherein the trim is an element separate from the second side flank and added to the second side flank.

15. The tailgate according to claim 1 wherein the trim is made from a material different from the material of the second side flank.

16. A tailgate of a motor vehicle comprising at least one side post to which a window is added, the side post constituting a U-shaped profile member with an open cross-section, in which an opening of the U-shaped profile member is turned towards the window, said U-shaped profile member including a base provided with a first side flank and a second side flank, wherein the first side flank is provided with a surface having a track for bonding with the window the second side flank including a trim which curves, away from a middle of the vehicle, towards the first flank so as to at least partially close the opening of the U-shaped profile member, the trim being added to the second side flank and extending from the second side flank without reducing a rear field of vision.

* * * * *

UNITED STATES PATENT AND TRADEMARK OFFICE
CERTIFICATE OF CORRECTION

PATENT NO.         : 10,792,984 B2
APPLICATION NO.    : 15/764903
DATED              : October 6, 2020
INVENTOR(S)        : Philippe Coudron Page 1 of 1

It is certified that error appears in the above-identified patent and that said Letters Patent is hereby corrected as shown below:

On the Title Page

Item (71), Line 1:
"Compagnie Plastic Omnium, Lyons"
Should be changed to:
--Compagnie Plastic Omnium, Lyon--

Item (73), Line 1:
"Compagnie Plastic Omnium, Lyons"
Should be changed to:
--Compagnie Plastic Omnium, Lyon--

Signed and Sealed this
Fifth Day of January, 2021

Andrei Iancu
*Director of the United States Patent and Trademark Office*